(12) United States Patent
Yamaguchi et al.

(10) Patent No.: US 8,900,019 B2
(45) Date of Patent: Dec. 2, 2014

(54) SOLAR CELL MODULE TERMINAL BOX

(75) Inventors: Hiroie Yamaguchi, Yao (JP); Takahide Kawanishi, Yao (JP)

(73) Assignee: Hosiden Corporation, Osaka (JP)

( * ) Notice: Subject to any disclaimer, the term of this patent is extended or adjusted under 35 U.S.C. 154(b) by 36 days.

(21) Appl. No.: 13/611,043

(22) Filed: Sep. 12, 2012

(65) Prior Publication Data

US 2013/0244503 A1    Sep. 19, 2013

(30) Foreign Application Priority Data

Oct. 13, 2011    (JP) ................................ 2011-226088

(51) Int. Cl.
*H01R 13/432*    (2006.01)
*H01L 31/048*    (2014.01)
*H01R 13/41*    (2006.01)

(52) U.S. Cl.
CPC ................. *H01R 13/41* (2013.01); *Y02E 10/50* (2013.01); *H01L 31/0485* (2013.01); *H01R 13/432* (2013.01)
USPC ........................................................ 439/747

(58) Field of Classification Search
USPC .......................................... 439/744–749, 751
See application file for complete search history.

(56) References Cited

U.S. PATENT DOCUMENTS

| | | | | |
|---|---|---|---|---|
| 3,897,131 A | * | 7/1975 | Stauffer ........................ | 439/655 |
| 4,381,134 A | * | 4/1983 | Anselmo et al. .............. | 439/444 |
| 4,460,232 A | * | 7/1984 | Sotolongo .................... | 439/535 |
| 5,035,656 A | * | 7/1991 | Patel ........................... | 439/733.1 |
| 5,411,418 A | * | 5/1995 | Welsh et al. .................. | 439/751 |
| 5,897,401 A | * | 4/1999 | Fili et al. ..................... | 439/733.1 |
| 6,042,429 A | * | 3/2000 | Bianca et al. ................ | 439/733.1 |
| 6,149,471 A | * | 11/2000 | Kemp et al. ................. | 439/733.1 |
| 6,344,612 B1 | * | 2/2002 | Kuwahara et al. ............ | 174/50 |
| 6,582,249 B1 | * | 6/2003 | Boeck et al. ................. | 439/492 |
| 6,655,987 B2 | * | 12/2003 | Higashikozono et al. ..... | 439/535 |
| 6,828,503 B2 | * | 12/2004 | Yoshikawa et al. ........... | 174/50 |
| 7,097,516 B2 | * | 8/2006 | Werner et al. ................ | 439/709 |
| 7,134,883 B2 | * | 11/2006 | Werner et al. ................ | 439/76.1 |
| 7,175,469 B1 | | 2/2007 | Daily et al. | |
| 7,282,635 B2 | * | 10/2007 | Utsunomiya et al. ......... | 136/244 |
| 7,285,006 B1 | * | 10/2007 | Daily et al. .................. | 439/441 |
| 7,291,036 B1 | * | 11/2007 | Daily et al. .................. | 439/487 |
| 7,365,965 B2 | * | 4/2008 | Higashikozono et al. ..... | 361/641 |
| 7,369,398 B2 | * | 5/2008 | Higashikozono et al. ..... | 361/641 |
| 7,387,537 B1 | * | 6/2008 | Daily et al. .................. | 439/620.22 |
| 7,444,743 B2 | * | 11/2008 | Feldmeier et al. ............ | 29/748 |
| 7,445,508 B2 | * | 11/2008 | Daily et al. .................. | 439/620.22 |
| 7,530,837 B2 | * | 5/2009 | Nieleck et al. ............... | 439/441 |

(Continued)

FOREIGN PATENT DOCUMENTS

| | | |
|---|---|---|
| EP | 2228830 A2 | 9/2010 |
| JP | 297763 U | 8/1990 |

(Continued)

*Primary Examiner* — Ross Gushi
(74) *Attorney, Agent, or Firm* — The Webb Law Firm

(57) ABSTRACT

A solar cell module terminal box includes a contact electrically connectable to an external terminal of a solar cell module, a connector member electrically connected to the contact, and a box main body. The box main body has an accommodating portion for accommodating the contact, an attaching portion accommodating the connector member and a wall member which partitions the accommodating portion and the attaching portion from each other. The wall member includes a connector insertion hole. The connector member is inserted in the connector insertion hole in tight/gapless contact therewith along the entire perimeter thereof.

5 Claims, 10 Drawing Sheets

(56) References Cited

U.S. PATENT DOCUMENTS

| | | | |
|---|---|---|---|
| 7,591,690 B1* | 9/2009 | Chien et al. | 439/709 |
| 7,618,265 B2* | 11/2009 | Rueggen et al. | 439/76.1 |
| 7,648,371 B2* | 1/2010 | Boensch et al. | 439/76.1 |
| 7,672,116 B2* | 3/2010 | Li et al. | 361/641 |
| 7,705,234 B2* | 4/2010 | Feldmeier et al. | 136/251 |
| 7,722,413 B2* | 5/2010 | Tonosaki | 439/751 |
| 7,723,608 B2* | 5/2010 | Higashikozono et al. | 136/244 |
| 7,723,609 B2* | 5/2010 | Yoshikawa et al. | 136/244 |
| 7,737,355 B2* | 6/2010 | Nieleck et al. | 136/243 |
| 7,763,807 B2* | 7/2010 | Richter | 174/138 F |
| 7,811,098 B2* | 10/2010 | Grimberg et al. | 439/76.1 |
| 7,824,189 B1* | 11/2010 | Lauermann et al. | 439/76.1 |
| 7,824,190 B2* | 11/2010 | Beck et al. | 439/76.1 |
| 7,833,033 B2* | 11/2010 | McMahon et al. | 439/212 |
| 7,862,383 B2* | 1/2011 | Cours et al. | 439/638 |
| 7,880,098 B2* | 2/2011 | Grimberg et al. | 174/547 |
| 7,914,298 B2* | 3/2011 | Lauermann et al. | 439/76.1 |
| 7,920,385 B2* | 4/2011 | Yoshikawa et al. | 361/752 |
| 7,927,132 B1* | 4/2011 | Lin | 439/527 |
| 7,928,314 B2* | 4/2011 | Higashikozono et al. | 136/244 |
| 7,928,315 B2* | 4/2011 | Nagai et al. | 136/244 |
| 7,938,661 B2* | 5/2011 | Good et al. | 439/271 |
| 7,939,754 B2* | 5/2011 | Richter et al. | 174/50 |
| 7,960,650 B2* | 6/2011 | Richter et al. | 174/50 |
| 7,972,177 B2* | 7/2011 | Richter | 439/620.26 |
| 7,988,486 B1* | 8/2011 | Lin | 439/527 |
| 8,003,885 B2* | 8/2011 | Richter et al. | 174/50 |
| 8,033,859 B2* | 10/2011 | Giefers | 439/441 |
| 8,040,678 B2* | 10/2011 | Tai et al. | 361/752 |
| 8,075,326 B2* | 12/2011 | Quiter et al. | 439/224 |
| 8,083,540 B1* | 12/2011 | Spicer et al. | 439/460 |
| 8,097,818 B2* | 1/2012 | Gerull et al. | 174/564 |
| 8,113,853 B2* | 2/2012 | Coyle et al. | 439/76.1 |
| 8,113,890 B2* | 2/2012 | Duesterhoeft | 439/855 |
| 8,128,439 B2* | 3/2012 | Feldmeier et al. | 439/709 |
| 8,137,115 B1* | 3/2012 | Chou et al. | 439/76.1 |
| 8,152,536 B2* | 4/2012 | Scherer et al. | 439/76.1 |
| 8,162,677 B2* | 4/2012 | Yu et al. | 439/76.2 |
| 8,187,016 B2* | 5/2012 | Vijh et al. | 439/276 |
| 8,192,233 B2* | 6/2012 | Duesterhoeft et al. | 439/620.21 |
| 8,197,263 B2* | 6/2012 | Rueggen et al. | 439/76.1 |
| 8,222,533 B2* | 7/2012 | Gherardini et al. | 174/260 |
| 8,248,804 B2* | 8/2012 | Han et al. | 361/717 |
| 8,308,504 B2* | 11/2012 | Ackermann et al. | 439/496 |
| 8,330,035 B2* | 12/2012 | Hattori | 136/244 |
| 8,353,725 B2* | 1/2013 | Ebihara et al. | 439/626 |
| 8,366,471 B2* | 2/2013 | Giefers | 439/329 |
| 8,388,358 B2* | 3/2013 | Thompson et al. | 439/76.1 |
| 8,403,711 B2* | 3/2013 | Xue et al. | 439/709 |
| 8,410,359 B2* | 4/2013 | Richter | 174/50 |
| 8,432,699 B2* | 4/2013 | Chou et al. | 361/730 |
| 8,471,144 B2* | 6/2013 | Kleiss et al. | 174/50 |
| 8,500,462 B2* | 8/2013 | Mills et al. | 439/76.1 |
| 8,512,050 B2* | 8/2013 | McGreevy et al. | 439/76.1 |
| 8,523,586 B2* | 9/2013 | Eusterholz | 439/259 |
| 8,547,685 B2* | 10/2013 | Yoshikawa et al. | 361/641 |
| 2001/0024913 A1 | 9/2001 | Kitamura | |
| 2004/0177987 A1* | 9/2004 | Yoshikawa et al. | 174/59 |
| 2004/0242082 A1* | 12/2004 | Tsuchiya | 439/751 |
| 2004/0261835 A1* | 12/2004 | Utsunomiya et al. | 136/244 |
| 2005/0022859 A1* | 2/2005 | Nass et al. | 136/251 |
| 2005/0054219 A1* | 3/2005 | Werner et al. | 439/76.1 |
| 2005/0054244 A1* | 3/2005 | Werner et al. | 439/682 |
| 2005/0197001 A1* | 9/2005 | Higashikozono et al. | 439/485 |
| 2005/0230140 A1* | 10/2005 | Higashikozono et al. | 174/59 |
| 2005/0236031 A1* | 10/2005 | Higashikozono et al. | 136/251 |
| 2006/0000504 A1* | 1/2006 | Feldmeier et al. | 136/251 |
| 2006/0049802 A1* | 3/2006 | Higashikozono et al. | 320/134 |
| 2006/0283628 A1* | 12/2006 | Feldmeier et al. | 174/260 |
| 2006/0289053 A1* | 12/2006 | Nieleck et al. | 136/244 |
| 2007/0137689 A1* | 6/2007 | Feldmeier et al. | 136/244 |
| 2007/0171667 A1 | 7/2007 | Watanabe et al. | |
| 2008/0011348 A1* | 1/2008 | Aoyama et al. | 136/244 |
| 2008/0110490 A1* | 5/2008 | Duesterhoeft | 136/248 |
| 2008/0115911 A1* | 5/2008 | Duesterhoeft | 165/104.21 |
| 2008/0160804 A1* | 7/2008 | Daily et al. | 439/152 |
| 2008/0190477 A1* | 8/2008 | Hattori | 136/246 |
| 2008/0232040 A1* | 9/2008 | Li et al. | 361/676 |
| 2008/0236886 A1* | 10/2008 | Gerull et al. | 174/535 |
| 2008/0248681 A1* | 10/2008 | Boensch et al. | 439/404 |
| 2008/0253092 A1* | 10/2008 | Duesterhoeft et al. | 361/710 |
| 2008/0280509 A1* | 11/2008 | Ma et al. | 439/837 |
| 2009/0025778 A1* | 1/2009 | Rubin et al. | 136/246 |
| 2009/0084570 A1* | 4/2009 | Gherardini et al. | 174/51 |
| 2009/0086444 A1* | 4/2009 | Yoshikawa et al. | 361/752 |
| 2009/0142954 A1* | 6/2009 | Boensch et al. | 439/422 |
| 2009/0209115 A1* | 8/2009 | Rueggen et al. | 439/76.1 |
| 2009/0227126 A1* | 9/2009 | Yoshikawa et al. | 439/76.1 |
| 2009/0260676 A1* | 10/2009 | McMahon et al. | 136/251 |
| 2009/0272559 A1* | 11/2009 | Richter et al. | 174/59 |
| 2009/0272574 A1* | 11/2009 | Richter et al. | 174/548 |
| 2009/0275231 A1* | 11/2009 | Richter | 439/535 |
| 2010/0012343 A1* | 1/2010 | Ji et al. | 174/50.52 |
| 2010/0018572 A1* | 1/2010 | Grimberg et al. | 136/252 |
| 2010/0075531 A1* | 3/2010 | Beck et al. | 439/405 |
| 2010/0105245 A1* | 4/2010 | Good et al. | 439/571 |
| 2010/0112851 A1* | 5/2010 | Giefers | 439/535 |
| 2010/0139760 A1* | 6/2010 | Giefers | 136/256 |
| 2010/0151725 A1* | 6/2010 | Grimberg et al. | 439/535 |
| 2010/0173511 A1* | 7/2010 | Giefers | 439/329 |
| 2010/0216336 A1* | 8/2010 | Quiter et al. | 439/567 |
| 2010/0218797 A1* | 9/2010 | Coyle et al. | 136/243 |
| 2010/0218802 A1* | 9/2010 | Quiter | 136/244 |
| 2010/0233909 A1* | 9/2010 | Scherer et al. | 439/625 |
| 2010/0263714 A1* | 10/2010 | Lauermann et al. | 136/251 |
| 2010/0294529 A1* | 11/2010 | Nunokawa | 174/60 |
| 2010/0311262 A1* | 12/2010 | Cours et al. | 439/281 |
| 2011/0008978 A1* | 1/2011 | MacDougall | 439/83 |
| 2011/0058337 A1* | 3/2011 | Han et al. | 361/717 |
| 2011/0073157 A1* | 3/2011 | Suzuki | 136/244 |
| 2011/0073362 A1* | 3/2011 | Shimizu | 174/520 |
| 2011/0081808 A1* | 4/2011 | Ebihara et al. | 439/626 |
| 2011/0092094 A1* | 4/2011 | Rueggen et al. | 439/540.1 |
| 2011/0108085 A1* | 5/2011 | Quiter | 136/244 |
| 2011/0136395 A1* | 6/2011 | Yamazaki | 439/709 |
| 2011/0168228 A1* | 7/2011 | McGreevy et al. | 136/244 |
| 2011/0195585 A1* | 8/2011 | Feldmeier et al. | 439/110 |
| 2011/0198120 A1* | 8/2011 | Richter et al. | 174/548 |
| 2011/0240088 A1* | 10/2011 | Ecob | 136/244 |
| 2011/0244719 A1* | 10/2011 | Xue et al. | 439/575 |
| 2011/0269347 A1* | 11/2011 | Ackermann et al. | 439/626 |
| 2011/0275232 A1* | 11/2011 | Duesterhoeft | 439/276 |
| 2011/0275244 A1* | 11/2011 | Duesterhoeft et al. | 439/620.21 |
| 2011/0290303 A1* | 12/2011 | Weldon et al. | 136/251 |
| 2012/0000689 A1* | 1/2012 | Shu et al. | 174/59 |
| 2012/0033392 A1* | 2/2012 | Golubovic et al. | 361/752 |
| 2012/0043106 A1* | 2/2012 | Richter et al. | 174/53 |
| 2012/0043986 A1* | 2/2012 | Richter et al. | 324/756.01 |
| 2012/0045937 A1* | 2/2012 | Richter et al. | 439/620.21 |
| 2012/0048614 A1* | 3/2012 | Xue et al. | 174/520 |
| 2012/0048615 A1* | 3/2012 | Masumoto | 174/547 |
| 2012/0052719 A1* | 3/2012 | Xue et al. | 439/485 |
| 2012/0067613 A1* | 3/2012 | Yu et al. | 174/59 |
| 2012/0069505 A1* | 3/2012 | Chou et al. | 361/679.01 |
| 2012/0071024 A1* | 3/2012 | Yu et al. | 439/540.1 |
| 2012/0071025 A1* | 3/2012 | Chou et al. | 439/540.1 |
| 2012/0075825 A1* | 3/2012 | Yamazaki | 361/809 |
| 2012/0077392 A1* | 3/2012 | Thompson et al. | 439/889 |
| 2012/0085565 A1* | 4/2012 | Kleiss et al. | 174/50 |
| 2012/0100731 A1* | 4/2012 | Umemoto et al. | 439/86 |
| 2012/0122343 A1* | 5/2012 | Limberg | 439/620.21 |
| 2012/0125682 A1* | 5/2012 | Lu et al. | 174/548 |
| 2012/0270450 A1* | 10/2012 | Leonhard et al. | 439/680 |
| 2013/0008683 A1* | 1/2013 | Xiao et al. | 174/58 |
| 2013/0010450 A1* | 1/2013 | Xiao et al. | 361/826 |

(56) References Cited

U.S. PATENT DOCUMENTS

| | | | |
|---|---|---|---|
| 2013/0012058 A1* | 1/2013 | Xiao et al. | 439/535 |
| 2013/0012059 A1* | 1/2013 | Xiao et al. | 439/535 |
| 2013/0012060 A1* | 1/2013 | Xiao et al. | 439/535 |
| 2013/0087360 A1* | 4/2013 | Xiao et al. | 174/60 |
| 2013/0244503 A1* | 9/2013 | Yamaguchi et al. | 439/733.1 |

FOREIGN PATENT DOCUMENTS

| | | |
|---|---|---|
| JP | 2001144315 A | 5/2001 |
| JP | 2001266989 A | 9/2001 |
| JP | 3769509 B2 | 2/2006 |
| JP | 2007200697 A | 8/2007 |
| JP | 2010251135 A | 11/2010 |

* cited by examiner

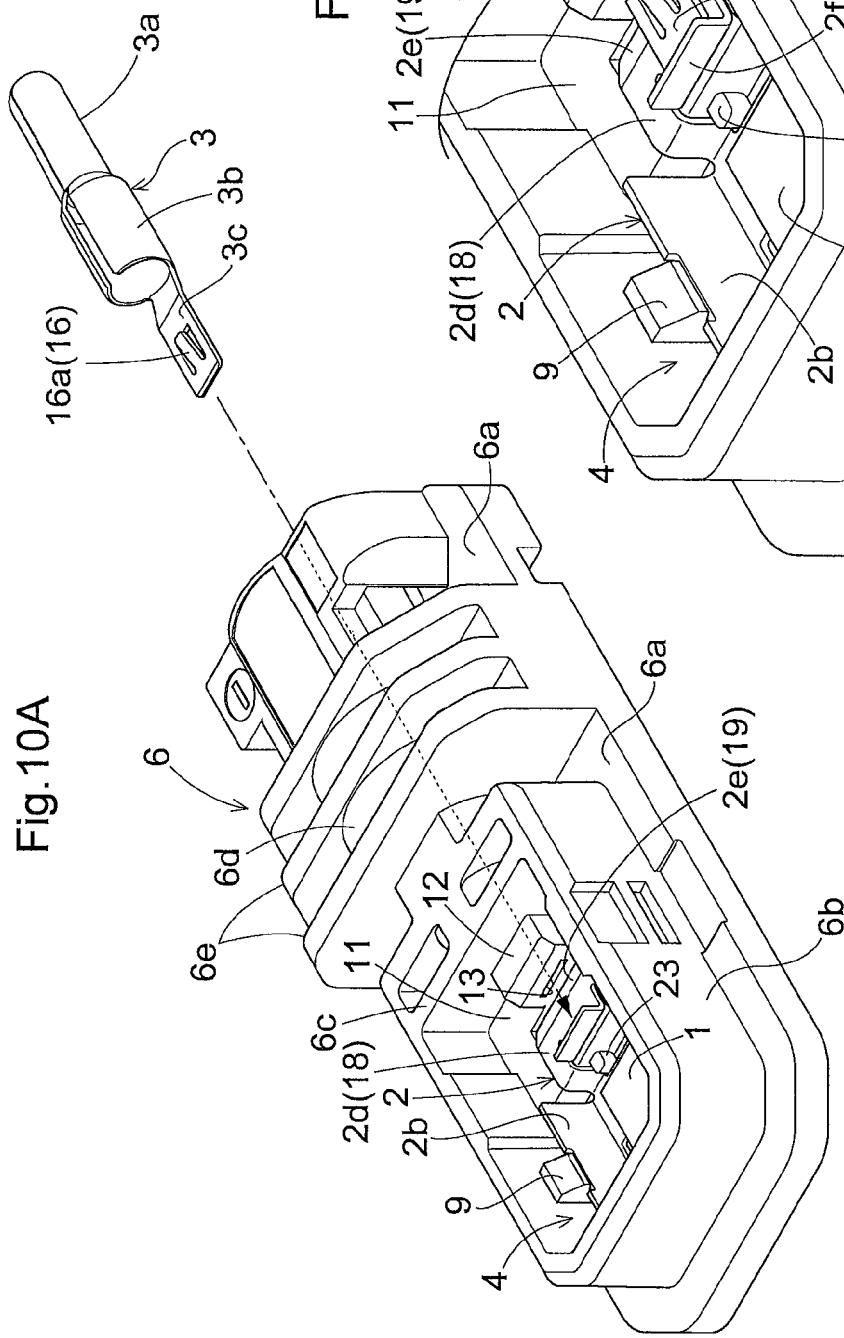
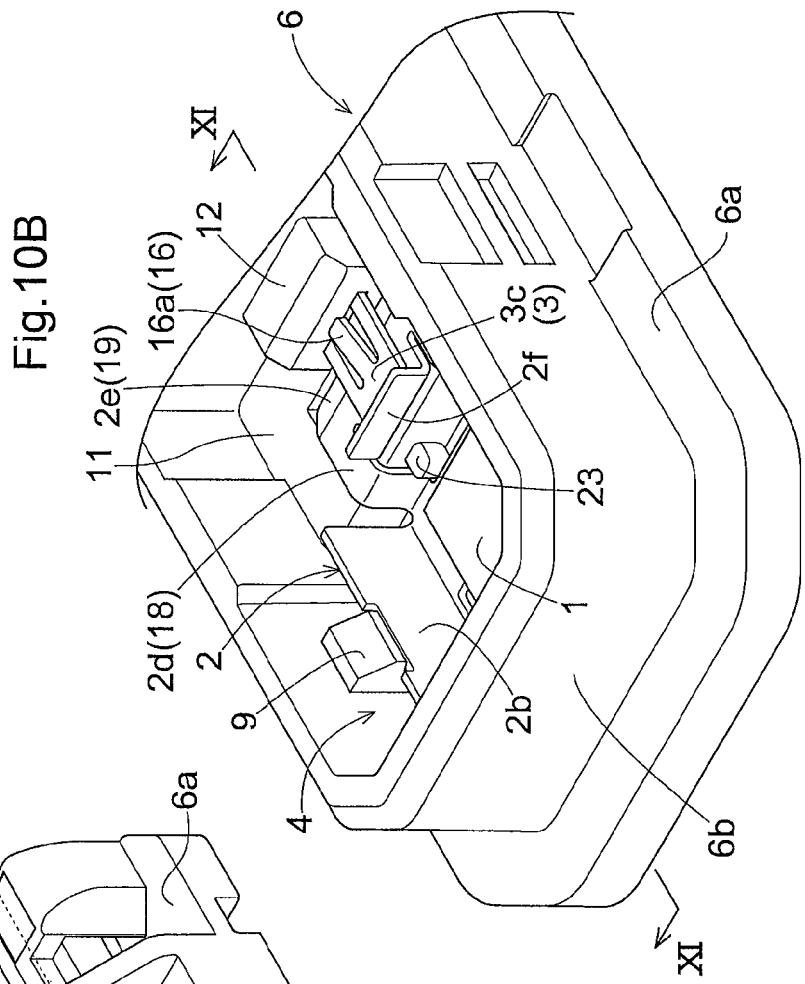

SOLAR CELL MODULE TERMINAL BOX

BACKGROUND OF THE INVENTION

1. Field of the Invention

The present invention relates to a solar cell module terminal box including a contact electrically connectable to an external terminal of a solar cell module, a connector member electrically connected to the contact, and a box main body, wherein the box main body has an accommodating portion for accommodating the contact, an attaching portion accommodating the connector member and a wall member which partitions the accommodating portion and the attaching portion from each other.

2. Description of the Related Art

With a solar cell module terminal box (referred to briefly as a "terminal box" hereinafter) described above, for the sake of water proofness and dust proofness at the connecting portion between the contact and the external terminal, it has been practiced conventionally to charge an amount of bonding material such as silicone resin to the accommodating portion of the contact and then allowing the material to solidified.

In order to connect the connector member to the contact, the connector member is inserted to a through hole formed in a wall member for example. In this case, there is a concern that unhardened bonding material charged to the contact accommodating portion may flow through a gap between the connector member and the through hole into the attaching portion of the connector member.

If unhardened bonding material enters the attaching portion of the connector member as above, this may adhere to a contact portion which is to come into electric contact with an external connector member electrically connected to e.g. an external connection cable, thus impairing the electric connection.

In order to avoid such situation as above, with the conventional terminal box, the connector member and the wall member are formed integral with each other by insert-molding the connector member in the wall member formed of resin, so as to avoid formation of such gap in the wall member which allows unwanted entrance of the bonding material to the attaching portion (see e.g. Japanese Patent No. 3769509).

In this case, there arises a need for e.g. a mold for the insertion molding, which may invite manufacture cost increase of the terminal box.

The present invention has been made in view of the above-described state of the art and its object is to provide a terminal box which can readily realize restriction of manufacture cost and which can also effectively restrict entrance of unhardened bonding material into the attaching portion of the connector member.

SUMMARY OF THE INVENTION

According to one embodiment of a solar cell module terminal box relating to the present invention, a solar cell module terminal box includes a contact electrically connectable to an external terminal of a solar cell module, a connector member electrically connected to the contact, and a box main body, wherein the box main body has an accommodating portion for accommodating the contact, an attaching portion accommodating the connector member and a wall member which partitions the accommodating portion and the attaching portion from each other; the wall member includes a connector insertion hole; and the connector member is inserted in the connector insertion hole in tight/gapless contact therewith along the entire perimeter thereof.

With the terminal box having the above-described arrangement, for the connection of the contact member to the contact, the connector member is inserted into the insertion hole formed in the wall member tightly along the entire perimeter thereof. Therefore, according to the terminal box having the above-described arrangement, the connector member and the insertion hole are placed in tight/gapless contact with each other, so when bonding material is charged to the accommodating portion of the contact, entrance of unhardened bonding material into the attaching portion of the contact member will hardly occur. Incidentally, with the above-described arrangement, because of the arrangement of inserting a connector member into an insertion hole formed in a wall member, restriction of manufacture cost can be readily achieved.

Further, since the connector member and the insertion hole are in tight/gapless contact with each other, in the course of connection of the connector member to an external connector member, it is possible to avoid looseness of the connector member relative to the box main body.

According to one embodiment of a solar cell module terminal box relating to the present invention, the connector member is inserted into the insertion hole from the side of the attaching portion; and the insertion hole includes a recessed face portion having an inner diameter which is progressively reduced toward the inserting direction downstream side of the connector member.

With the above-described arrangement, when the connector member is to be inserted into the insertion hole from the side of the attaching portion, the insertion direction leading end portion of the connector member will be guided along the recessed face portion into the insertion hole. Therefore, the connector member can be readily assembled with the box main body.

According to one embodiment of a solar cell module terminal box relating to the present invention, the contact includes a connection face to be electrically connected to the connector member and a guide face for guiding the connector member inserted in the insertion hole to be overlapped with the connection face.

With the above-described arrangement, with the operation of inserting the connector member into the insertion hole, the insertion direction leading end portion of the connector member drawn out of the insertion hole can be guided to be overlapped with the connection face of the contact. Therefore, the connector member can be readily connected to the contact.

According to one embodiment of a solar cell module terminal box relating to the present invention, the contact includes a clamping piece capable of elastically clamping the connector member guided to be overlapped with the connection face between this clamping piece and the connection face.

With the above-described arrangement, without need to solder or weld the contact and the contact member to each other, by elastically clamping the contact member between the clamping piece and the connection face by the operation of inserting the contact member into the insertion hole, the contact and the contact member can be electrically connected to each other.

According to one embodiment of a solar cell module terminal box relating to the present invention, the connector member includes a retention portion capable of allowing insertion of the contact member into the insertion hole and capable also of retaining the contact member against inadvertent withdrawal thereof from the insertion hole through retention relative to the box main body.

With the above-described arrangement, inadvertent withdrawal of the contact member from the insertion hole can be prevented in a reliable manner.

According to one embodiment of a solar cell module terminal box relating to the present invention, a portion of the connector member present in the attaching portion includes a contact portion to be electrically contacted with an external connector member and a non-contact portion closer to the wall member than the contact portion, and the non-contact portion has a length than the length of the contact portion.

With the above-described arrangement, the contact member can be attached in such a manner that the contact portion to the external connector member may be spaced from the wall member via the non-contact portion. And, since the non-contact portion has a length than the length of the contact portion, even if bonding material charged to the accommodating portion of the contact should enter the attaching portion of the connector member, the possibility of this becoming adhered to the contact portion will be low.

BRIEF DESCRIPTION OF THE DRAWINGS

FIG. 10A is an exploded perspective view of a box main body according to a third embodiment,
FIG. 10B is a perspective view showing the interior of the box main body according to the third embodiment.

DETAILED DESCRIPTION OF THE PREFERRED EMBODIMENTS

Figure 1:
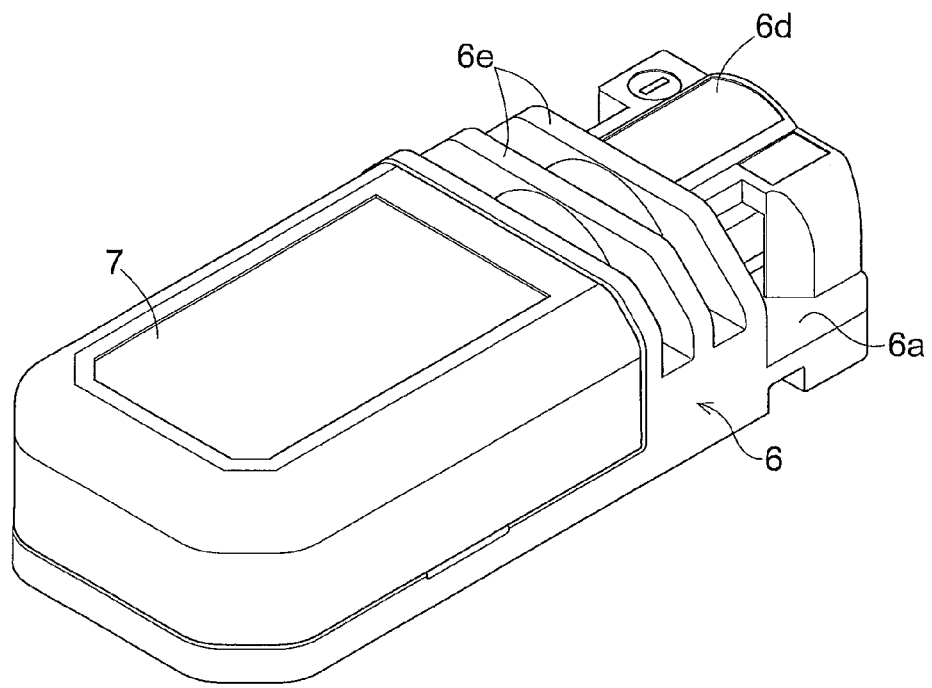
FIG. 1 is a perspective view of a terminal box.
Figure 2:
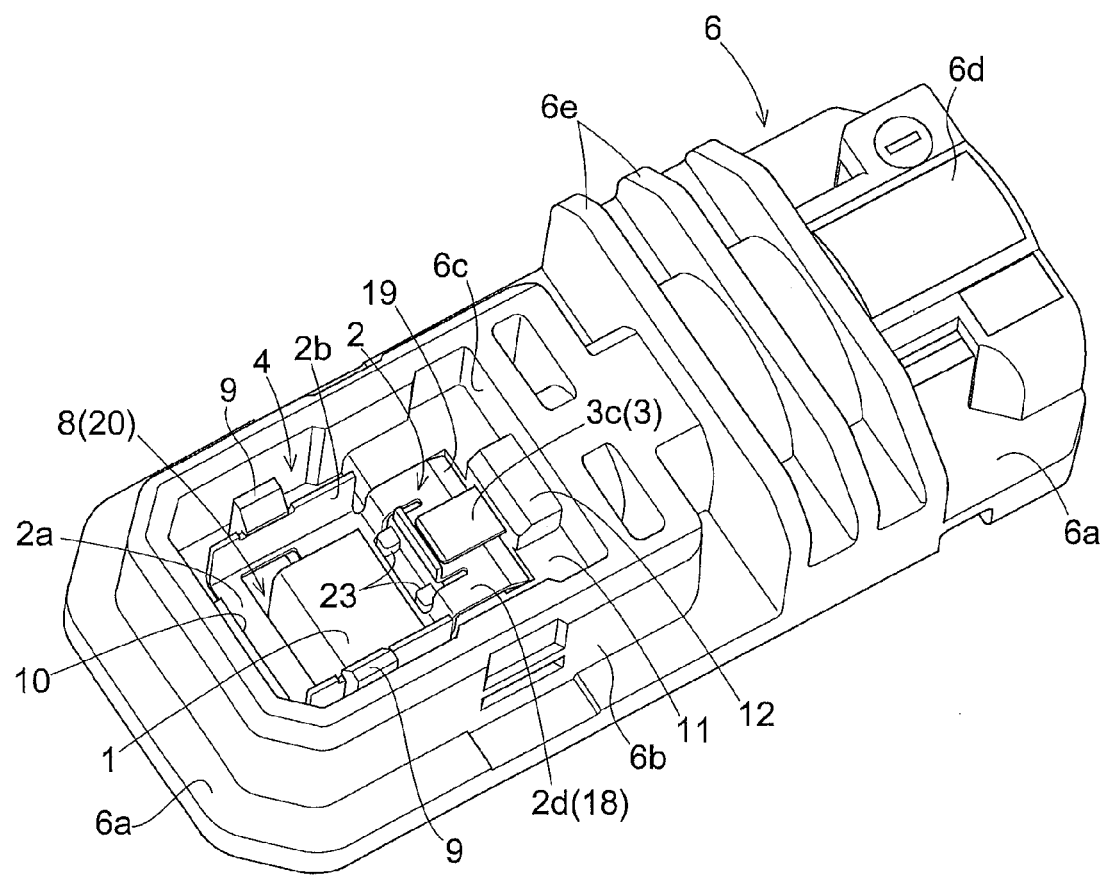
FIG. 2 is a perspective view showing the interior of a box main body.

Next, embodiments of the present invention will be described with reference to the accompanying drawings.

First Embodiment

FIGS. 1 through 6 show a solar cell module terminal box according to an embodiment of the present invention. The terminal box is for use in electrically connecting an external terminal (tab) 1 of a solar cell module (not shown) to an external connection cable (not shown).

The terminal box includes a box main body 6 having an approximately rectangular shape in its plane view and formed of resin, and a lid body 7 formed of resin for closing an upper opening of an accommodating portion 4. Further, the box main body 6 includes a contact (terminal plate) 2 formed of a sheet metal, a connector member 3 formed of a sheet metal, the accommodating portion 4 and an attaching portion 5 (see FIG. 5). The contact 2 can be electrically connected to the external terminal 1 of the solar cell module by soldering or welding. The connector member 3 is electrically connected to the contact 2. The accommodating portion 4 accommodates the contact 2. The attaching portion 5 accommodates the connector member 3.

The accommodating portion 4 is comprised of a bottom plate 6a of a box main body 6, a peripheral wall portion 6b having an approximately rectangular shape in its plane view and an inner wall portion 6c provided inside the peripheral wall portion 6b of the same. The accommodating portion 4 is open upwards and is disposed between the inner wall portion 6c on one longitudinal end side of the box main body 6 and a peripheral wall portion 6b thereof having an angular hook shape as seen in the plane view.

At the bottom plate portion of the accommodating portion 4, there is formed therethrough a laterally elongated terminal connection hole 8 for allowing introduction of the external terminal 1. Further, on the left and right opposed sides across the terminal connection hole 8 provided in the bottom plate portion of the accommodating portion 4, there are integrally formed a pair of engaging pawls 9. Moreover, in the bottom plate portion of the accommodating portion 4, there is integrally formed a positioning ridge 10 for the contact 2 along one lateral edge of the longitudinal direction of the terminal connection hole 8.

The attaching portion 5 integrally forms, in the bottom plate 6a, a split-cylindrical upper wall portion 6d along the longitudinal direction of the box main body 6 and along the inner wall portion 6c from the end opposite to the end where the accommodating portion 4 is formed, and is provided in the form of a laterally open circular hole between the upper wall portion 6d and the bottom plate 6a on the side opposite to the side where the accommodating portion 4 of the box main body 6 is formed. Between the outer peripheral side of the upper wall portion 6d and the bottom plate 6a, there are integrally formed a plurality of reinforcing ribs 6e along the longitudinal direction of the upper wall portion 6d.

Along the raised portion of the inner wall portion 6c in the accommodating portion 4, there is formed a stepped portion 11 raised from the bottom plate 6a. On the upper face of the stepped portion 11, there is formed, as a projection therefrom, a wall member 12 that partitions the accommodating portion 4 from the attaching portion 5. The wall member 12 defines therethrough a connector insertion hole 13 for allowing insertion of the connector member 3 therethrough. The connector insertion hole 13 is formed with a rectangular cross sectional shape having a narrow distance along the direction of the short side thereof.

The connector member 3 includes a connection pin 3a, a cylindrical plate portion 3b and a connection plate portion 3c with these being formed integral with each other. The connection pin 3a is to be engaged within and electrically connected to an external connector member (not shown) such as a socket electrically connected to an external connection cable. The cylindrical plate portion 3b is engaged within the inner peripheral face of the attaching portion 5 and has a C-shaped cross section. The connection plate portion 3c is electrically connected to the contact 2 and has a flat band-like shape.

Figure 5:
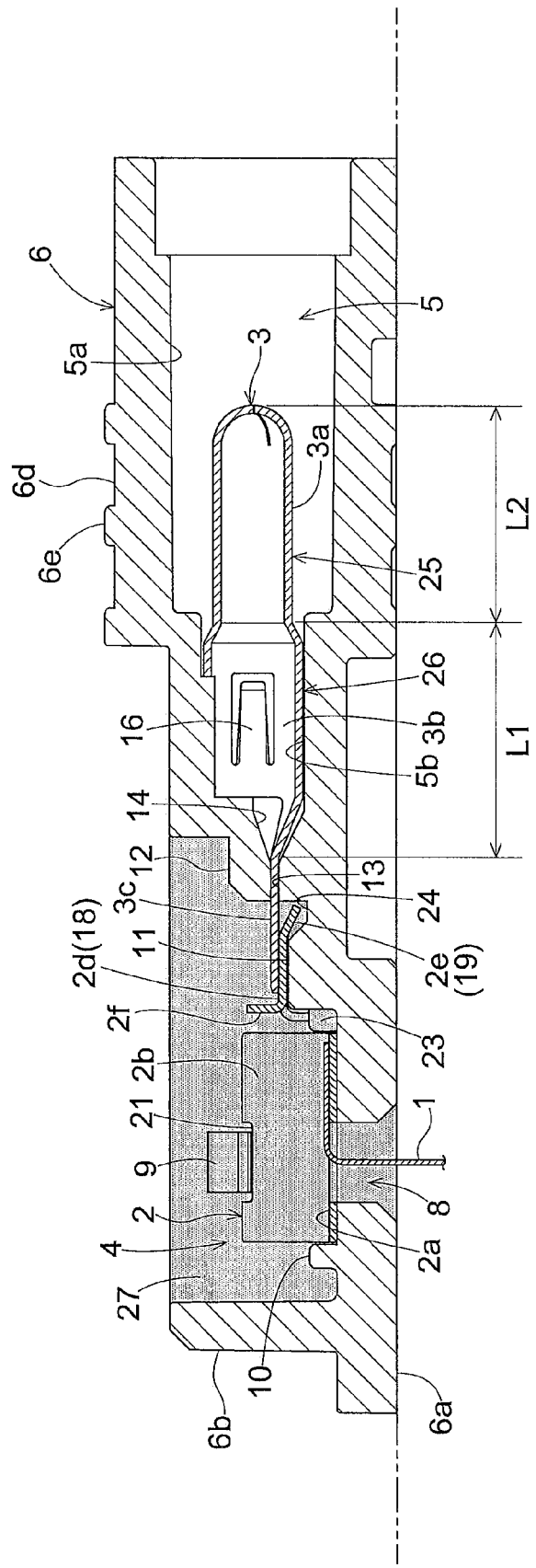
FIG. 5 is a section view taken along a line V-V in FIG. 4.

The attaching portion 5, as shown in FIG. 5, includes a large diameter portion 5a which surrounds the connection pin 3a coaxially and a small diameter portion 5b within which the cylindrical plate portion 3b is engaged. The large diameter portion 5a is open toward the lateral side of the box main body 6. Incidentally, though not shown, the connector member 3 may include, instead of the connection pin 3a, a socket engageable externally over an external connector member such as a plug electrically connected to the external connection cable.

The connector member 3 is connected to the contact 2 by means of soldering or welding as being inserted into the connector insertion hole 13 from the side of the attaching portion 5 in such a manner that the connection plate portion 3c being placed in tight contact with the inner peripheral face of the connector insertion hole 13 along the entire perimeter thereof, that is, with no gap being formed between the outer peripheral face of the connection plate portion 3c and the inner peripheral face of the connector insertion hole 13.

As shown in FIG. 5, the connector insertion hole 13 includes, on the side of the attaching portion 5, a recessed face portion 14 having an inner diameter which is progressively reduced toward the inserting direction downstream side of the connection plate portion 3c. The recessed face portion 14 constitutes a guide face for guiding the insertion direction leading end of the connection plate portion 3c to the connector insertion hole 13 when the connection plate portion 3c is to be inserted into the connector insertion hole 13.

Figure 4:
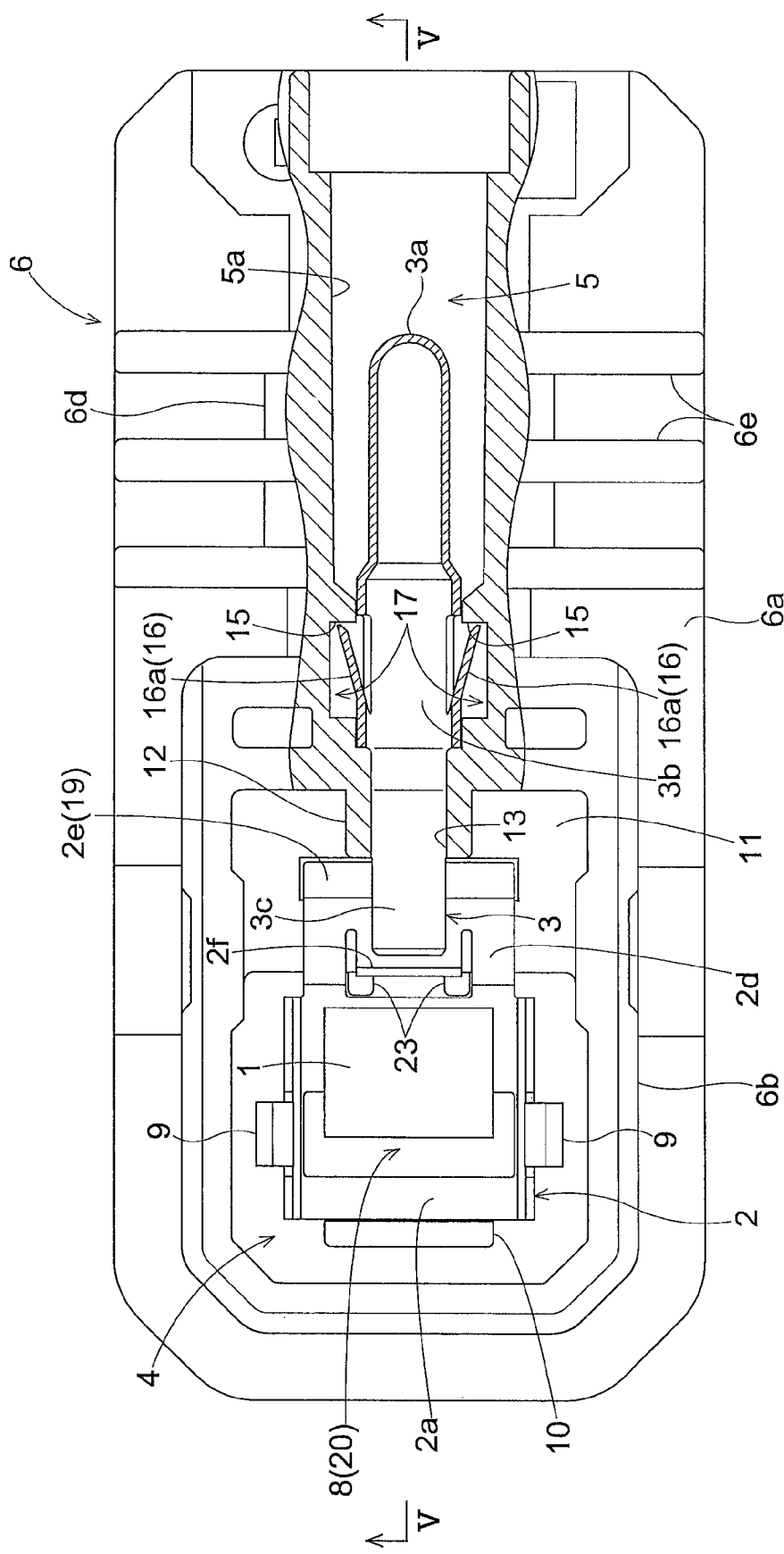
FIG. 4 is a plane view in partial section showing the interior of the box main body.

The cylindrical plate portion 3b of the connector member 3 forms an anti-withdrawal retention portion 16, as shown in FIG. 4 and FIG. 5. The retention portion 16 allows insertion of the connector member 3 (connection plate portion 3c) into the connector insertion hole 13 from the side of the attaching portion 5 and also prevents inadvertent withdrawal of the connector member 3 from the connector insertion hole 13 by retention with a pair of retaining recessed portions 15 formed in the inner peripheral face of the small diameter portion 5b.

This retention portion 16 is formed by raising a pair of left and right retaining pieces 16a which progressively depart from each other away from the cylindrical plate portion 3b toward the rear side along the insertion direction. Each retaining piece 16a is elastically deformed into a posture along the inner peripheral face of the small diameter portion 5b during the insertion of the connection plate portion 3c into the connector insertion hole 13, thereby to allow the insertion of the connection plate portion 3c into the connector insertion hole 13. Then, once the leading end of the connection plate portion 3c has exited the connector insertion hole 13, the retention portion 16 will be resiliently deformed to enter the retaining recessed portion 15 and will be retained by this retaining recessed portion 15, thus preventing inadvertent withdrawal of the connection plate portion 3c.

Figure 6:
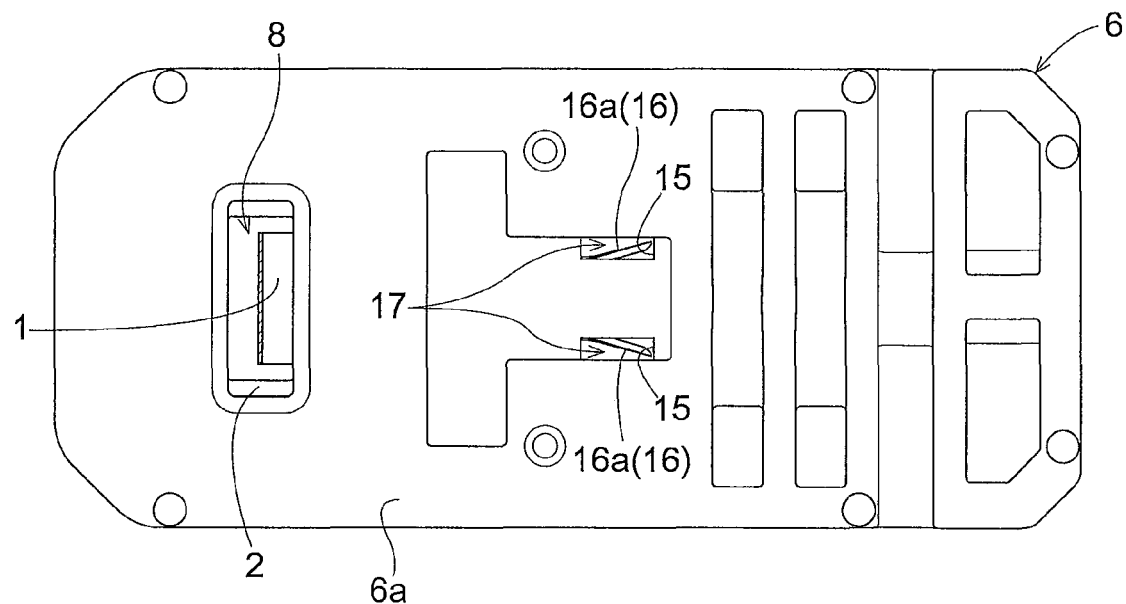
FIG. 6 is a bottom view of the terminal box.

As shown in FIG. 6, the bottom plate 6a defines a through hole 17 communicated to each retaining recessed portion 15. With insertion of e.g. a leading end of a driver via the through hole 17, the retaining piece 16a introduced into the retaining recessed portion 15 can be elastically deformed to the retention releasing side.

Figure 3:
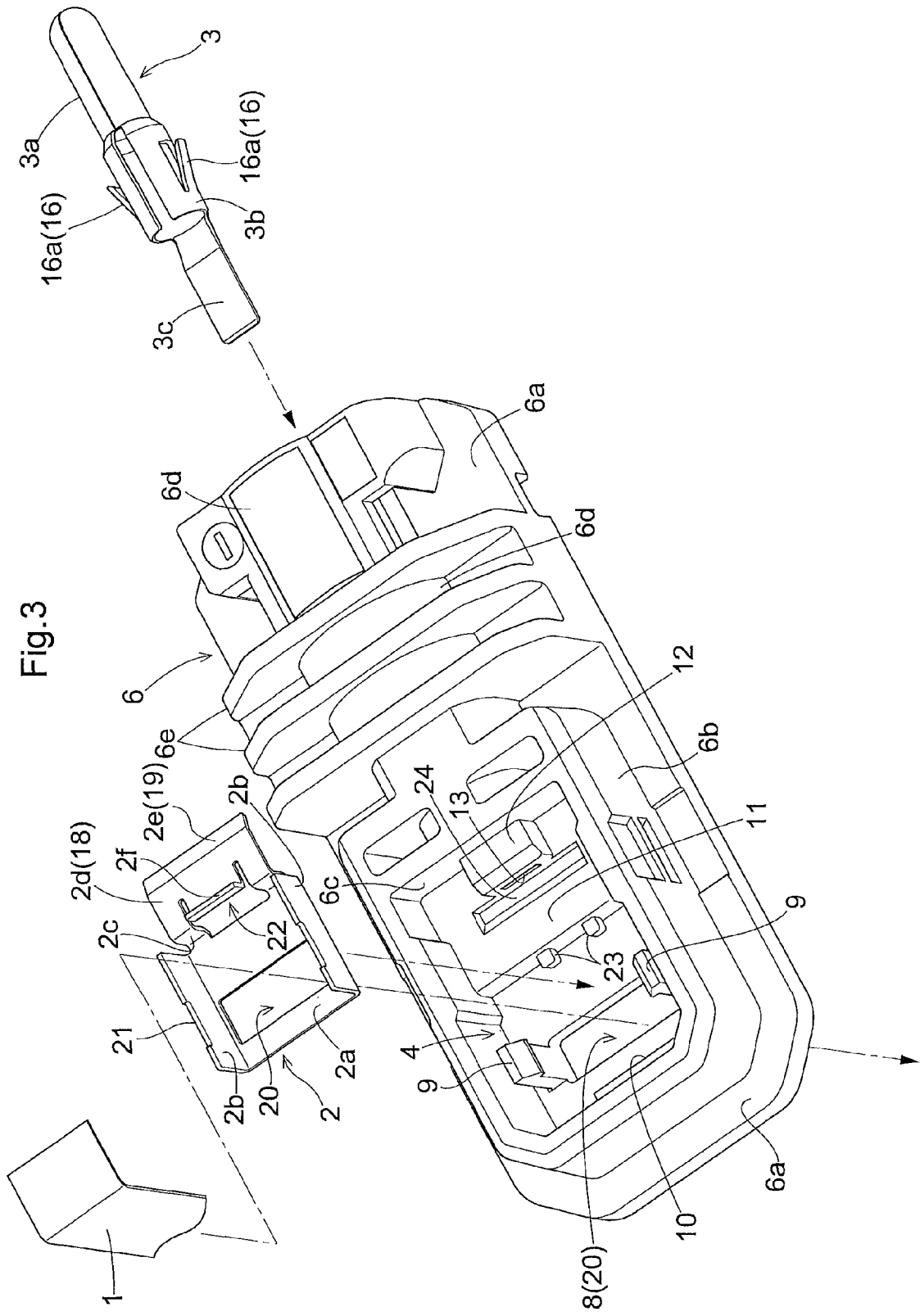
FIG. 3 is an exploded perspective view showing the interior of the box main body.

The contact 2, as shown in FIG. 3, integrally includes a base plate portion 2a, a retention plate portion 2b, a bent plate portion 2c, a connection plate portion 2d, a guide plate portion 2e and an upper edge plate portion 2f. The base plate portion 2a has a rectangular shape and is placed on the bottom plate 6a. The retention plate portion 2b is bent at an upward right angle from the left and left opposed sides thereof. The bent plate portion 2c is bent to an upward right angle from the side of the stepped portion 11 of the base plate portion 2a. The connection plate portion 2d is bent at a laterally oriented right angle from the upper end of the bent plate portion 2c to be aligned along the upper face of the stepped portion 11. The guide plate portion 2e is bent obliquely downwards from the side of the wall member 12 of the connection plate portion 2d. The upper edge plate portion 2f is bent at an upward right angle from the side of the bent plate portion 2c of the connection plate portion 2d.

The upper face of the connection plate portion 2d constitutes a connection face 18 to be electrically connected to the connector member 3. The upper face of the guide plate portion 2e constitutes a guide face 19 for guiding the connection plate portion 3c inserted in the connector insertion hole 13 to be overlapped with the connection face 18.

The base plate portion 2a forms a terminal insertion hole 20 into which the external terminal 1 is to be inserted. At the upper edge of each retaining plate portion 2b, a cutout 21 is formed. The bent plate portion 2c defines a rectangular opening 22.

In the lateral face of the stepped portion 11 on the side of the terminal connection hole 8, there are integrally formed a pair of left and right retaining pins 23. In the upper face of the stepped portion 11, there is formed a recessed portion 24 in which the guide plate portion 2e is to be introduced.

The contact 2 retains the retaining pawls 9 to the cutouts 21 of the respective retaining plate portions 2b with placing one lateral side of the base plate portion 2a in abutment against/along the positioning ridge 10 and introduces the pair of retaining pins 23 into the opening 22 of the bent plate portion 2c. With this, the contact 2 is fixed to the accommodating portion 4, with communication being established between the terminal insertion hole 20 and the terminal connection hole 8, with the base plate portion 2a being placed on the bottom plate 6a and the guide plate portion 2e being introduced in the recessed portion 24.

The connector member 3 is guided by the guide face 19 so that the leading end of the connection plate portion 3c exiting the insertion hole 13 is overlapped with the connection face 18. With soldering or welding of the leading end of the connection plate portion 3c and the connection plate portion 2d, electric connection is established between the connector member 3 and the contact 2.

As shown in FIG. 5, at portions of the connector member 3 where the attaching portion 5 is present, there are provided a contact portion 25 to be electrically contacted to the external connector member and a non-contact portion 26 closer to the wall member 21 than the contact portion 25, and the non-contact portion 26 has a length L1 which is greater than the length L2 of the contact portion 25.

And, as the box main body 6 is bonded and fixed to e.g. a back face of a solar cell module with the external terminal 1 being electrically connected to the contact 2 by means of soldering or welding, and an amount of bonding material 27 such as a silicone resin will be charged into the accommodating portion 4.

Second Embodiment

Figure 7:
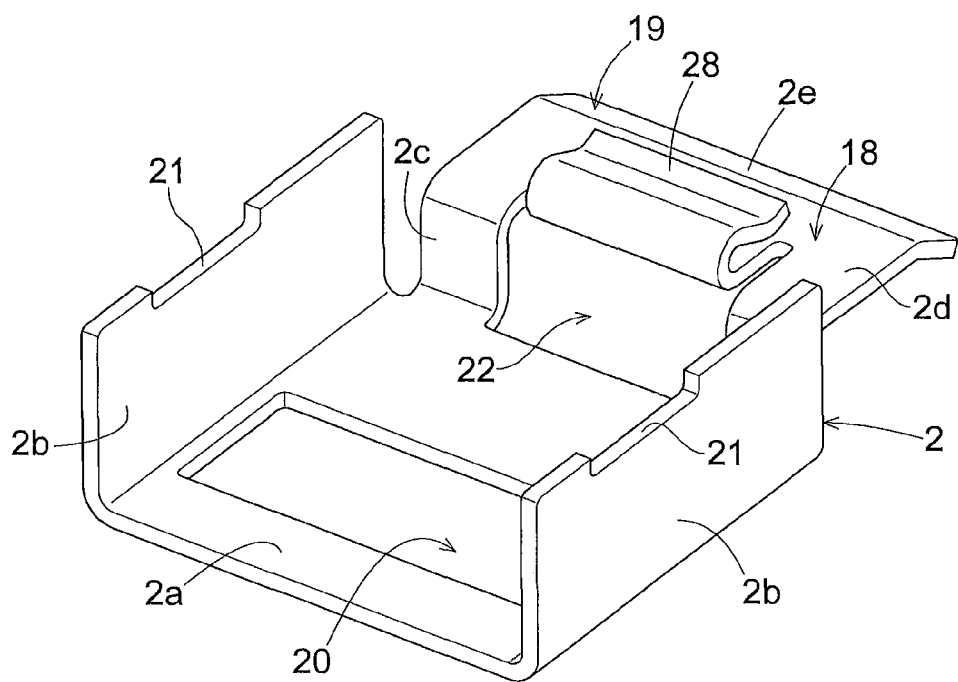
FIG. 7 is a perspective view of a contact according to a second embodiment.
Figure 8:
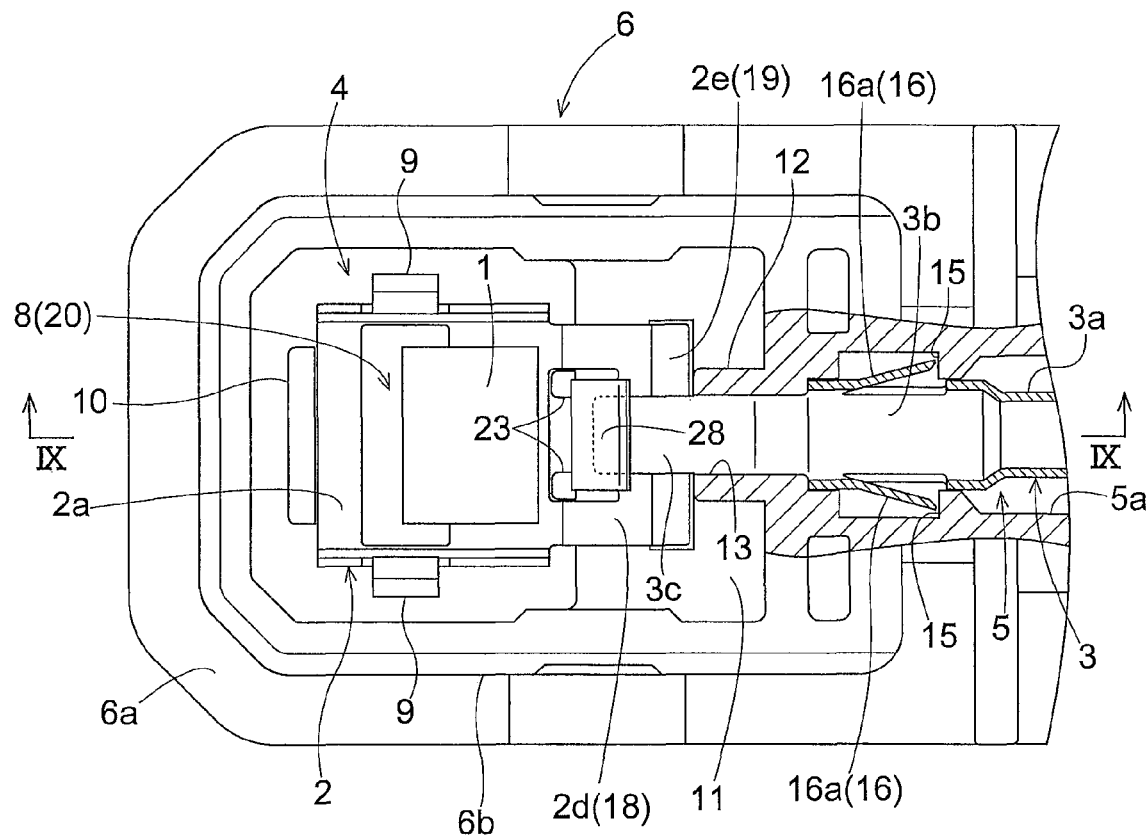
FIG. 8 is a plane view in partial section showing the interior of a box main body in the second embodiment.
Figure 9:
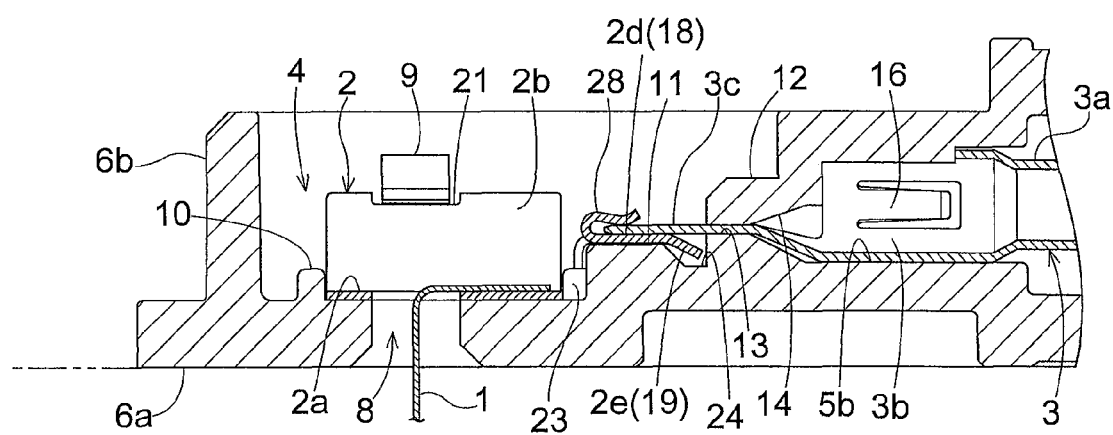
FIG. 9 is a section view taken along a line IX-IX in FIG. 8.

FIGS. 7 through 9 show a terminal box according to a second embodiment of the present invention. In this embodiment, on the side of the bent plate portion 2c of the connection plate portion 2d of the contact 2, instead of the upper edge plate portion 2f shown in the first embodiment above, there is formed a clamping piece 28 by bending. The clamping piece 28 is capable of elastically clamping the insertion direction leading end of the connection plate portion 3c guided to be overlapped with the connection face 18 between this piece and the connection face 18. The rest of the arrangements are same as the first embodiment.

Third Embodiment

Figure 11:
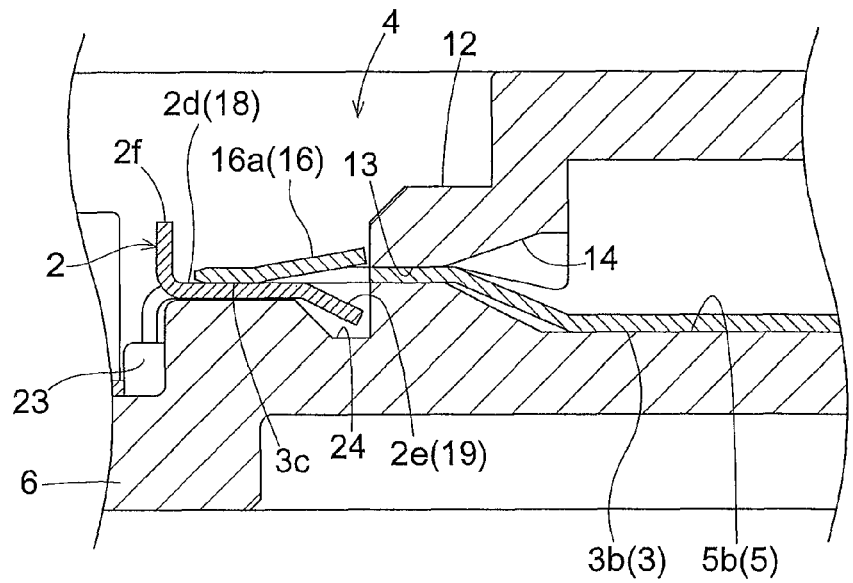
FIG. 11 is a section view taken along a line XI-XI in FIG. 10B.

FIG. 10A, FIG. 10B and FIG. 11 show a terminal box according to a third embodiment of the present invention. In this embodiment, the anti-withdrawal retention portion 16 is provided at the leading end of the connection plate portion 3c along the insertion direction into the insertion hole 13. This retention portion 16 is formed by cutting out and raising the retaining piece 16a from the connection plate portion 3c. And, the retaining piece 16a is configured to extend progressively away from the connection plate portion 3c toward the rear side in the insertion direction.

During insertion of the connection plate portion 3c into the insertion hole 13, the retaining piece 16a is elastically deformed into a posture along the inner peripheral face of the insertion hole 13, thereby to allow this insertion of the connection plate portion 3c into the insertion hole 13. Then, once exiting the insertion hole 13, the retaining piece 16a will be resiliently deformed and will be retained by the outer face of the wall member 12 as shown in FIG. 11, thus preventing inadvertent withdrawal of the connector member 3.

The rest of the arrangements are same as the first embodiment.

Fourth Embodiment

Figure 12:
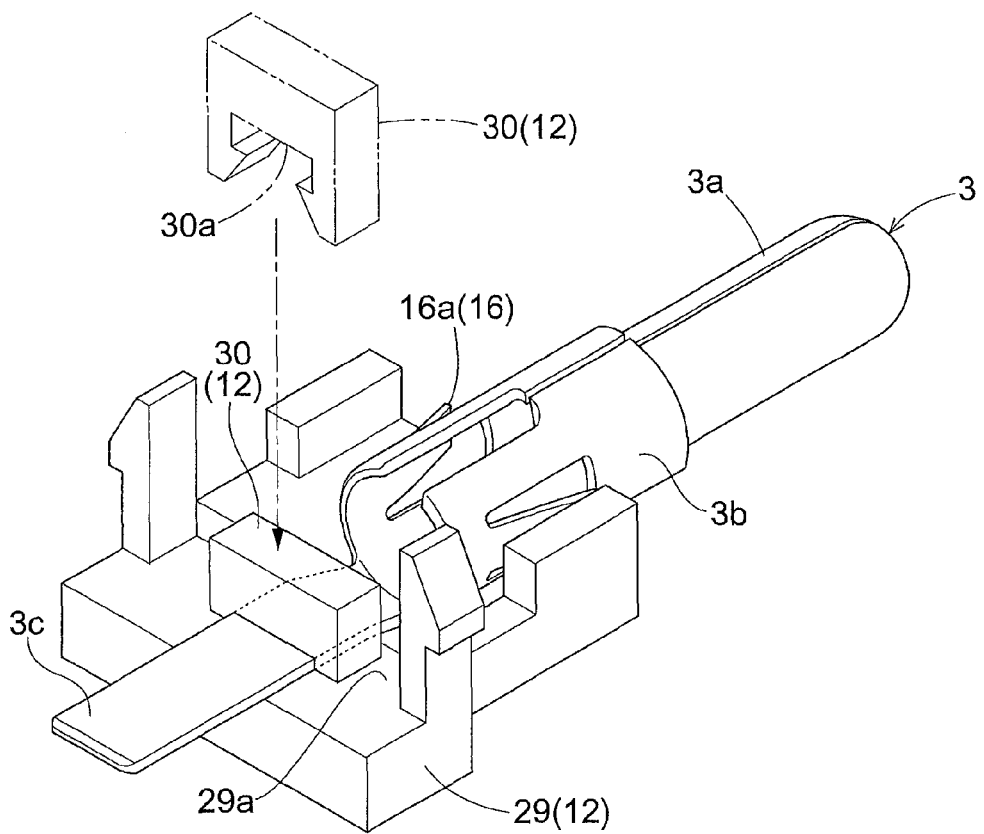
FIG. 12 is a perspective view showing principal portions in a fourth embodiment.

FIG. 12 shows a terminal box according to a fourth embodiment of the present invention. In this embodiment, the wall member 12 through which the connection plate portion 3c of the connector member 3 is inserted is constituted of two members 29, 30 that together clamp the connection plate portion 3c in a surrounding manner. As these two member 29, 30 are assembled to the box main body 6, the wall member 12 is formed.

The lower member 29 includes an upwardly oriented tight contact face 29a which comes into tight contact with the lower face of the connection plate portion 3c, and the upper member 30 includes a downwardly oriented tight contact face 30a having a downwardly oriented angular hook shape which comes into tight contact with the upper face and the lateral face of the connection plate portion 3c. The lower member 29 and the upper member 30 as assembled together can be assembled to the box main body 6.

The rest of the arrangements are same as the first embodiment.

Fifth Embodiment

Figure 13:
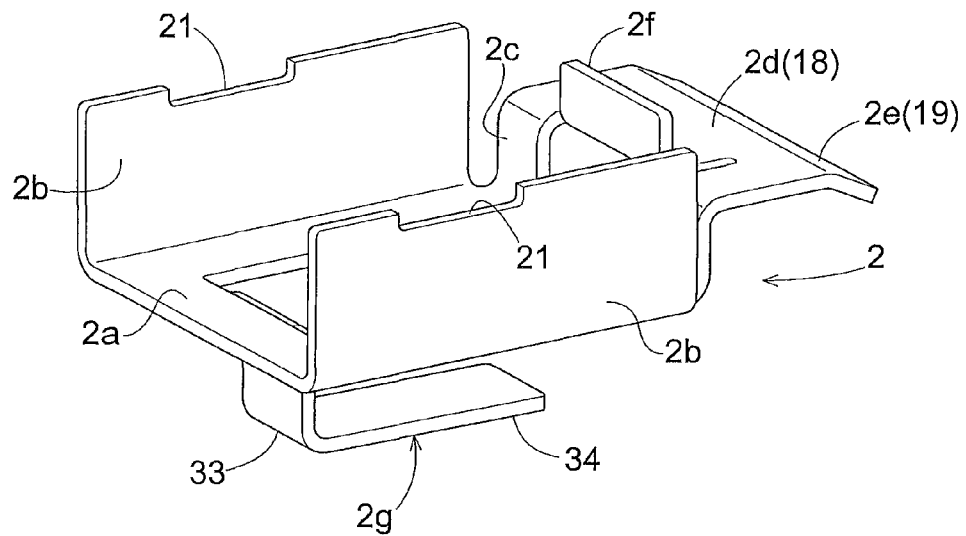
FIG. 13 is a perspective view showing a contact in a fifth embodiment.
Figure 14:
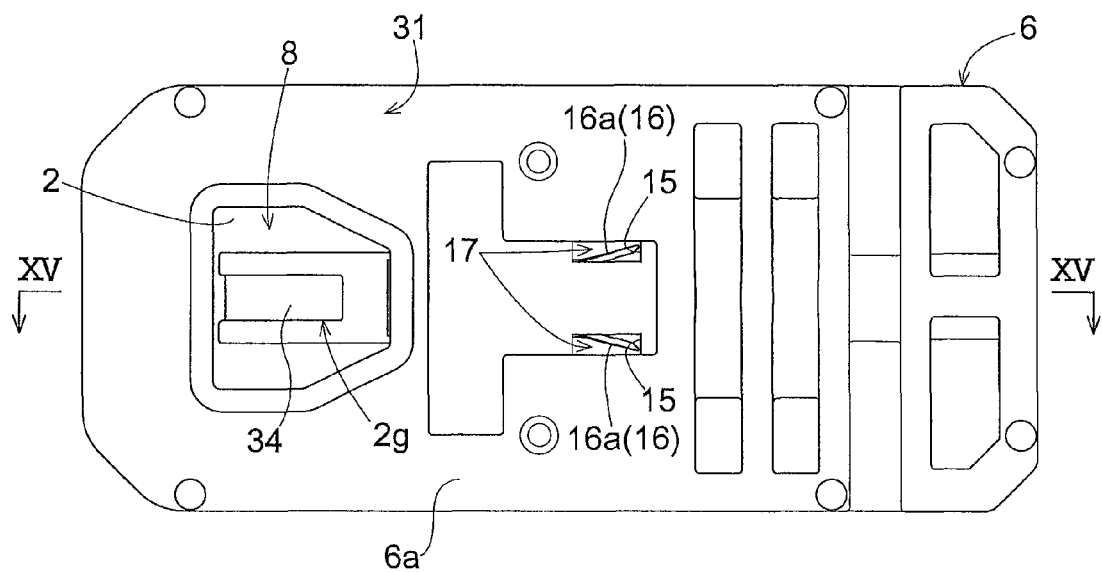
FIG. 14 is a bottom view showing a terminal box according to the fifth embodiment.
Figure 15:
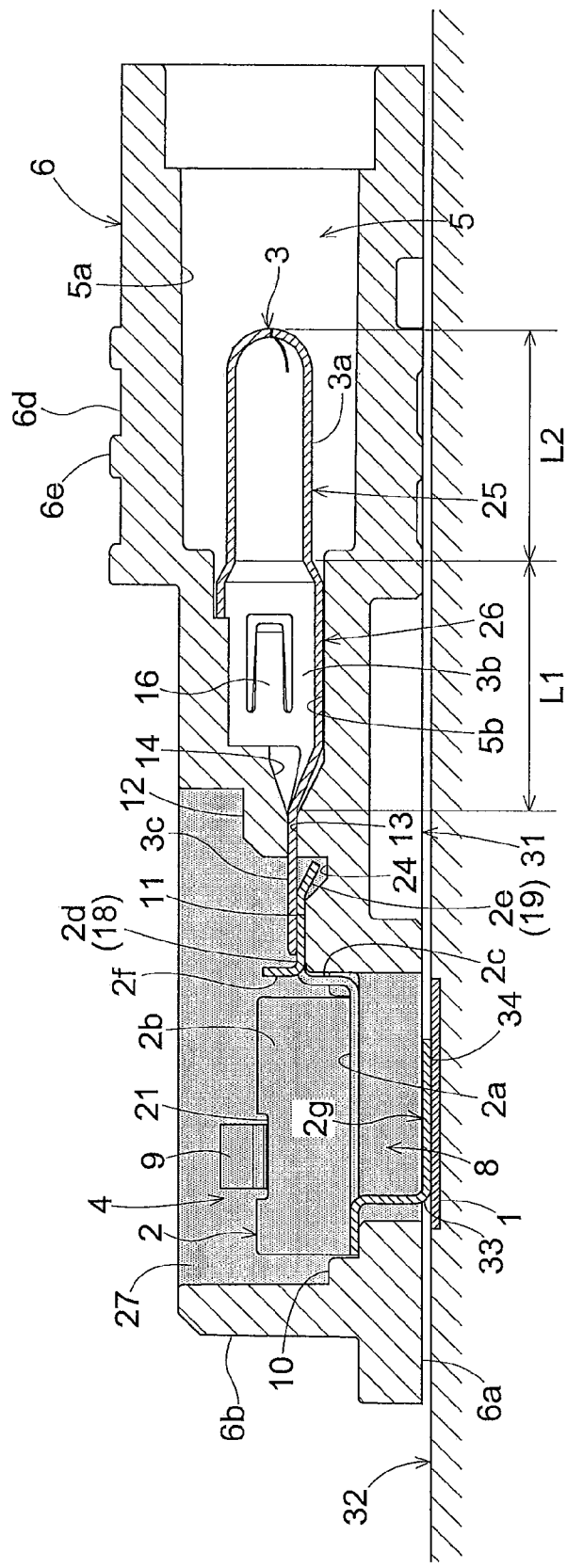
FIG. 15 is a section view taken along a line IV-IV in FIG. 14.

FIGS. 13 through 15 show a terminal box according to a fifth embodiment of the present invention. The contact 2 of the terminal box according to this embodiment includes an external connection plate portion 2g. This external connection plate portion 2g can be overlapped with the external terminal 1 wherein the contact 2 is disposed along a fixed face 32 when the back face 31 of the terminal box is to be bonded and fixed to this fixed face 32 such as the back face of the solar cell module.

The external connection plate portion 2g, as shown in FIG. 13, is formed in the L-shape as viewed in the side view having an elastic bent portion 33 by cutting out and raising a part of the base plate portion 2a. Further, as shown in FIG. 14 and FIG. 15, as the external connection plate portion 2g is inserted in the terminal connection hole 8, the leading end portion 34 is caused to be exposed to more outer side than the back face 31 of the terminal box.

And, as shown in FIG. 15, as the back face 31 of the terminal box is bonded to the fixed face 32 so as to bring the terminal connection hole 8 to face the external terminal 1, the external connection plate portion 2g will be overlapped with the external terminal 1 and can be electrically connected thereto by means of soldering or welding.

The rest of the arrangements are same as the first embodiment.

Other Embodiments (1) In the solar cell module terminal box according to the present invention, a tab or the like constituting a portion of the external terminal may be connected in advance to the contact and the bonding material may be then charged in the accommodating portion. Alternatively, the bonding material may be charged into the accommodating portion after the attachment.

(2) In the solar cell module terminal box according to the present invention, the connector member may be inserted to the wall member in such a manner that the connector member is placed in tight/gapless contact with this wall member along the entire perimeter thereof.

The invention claimed is:

1. A solar cell module terminal box comprising:
a contact electrically connectable to an external terminal of a solar cell module;
a connector member electrically connected to the contact; and
a box main body;
wherein the box main body has an accommodating portion for accommodating the contact, an attaching portion accommodating the connector member and a wall member which partitions the accommodating portion and the attaching portion from each other;
the wall member includes a connector insertion hole with a rectangular cross sectional shape;
the connector member has a connection plate portion electrically connected to the contact and has a flat band-like shape,
the connection plate portion is inserted in the connector insertion hole in tight/gapless contact therewith along the entire perimeter thereof;
the connector member is inserted into the insertion hole from the side of the attaching portion; and
the insertion hole includes a recessed face portion formed in the side of the attaching portion and having an inner diameter which is progressively reduced toward the inserting direction downstream side of the connector member and leads to the connection insertion hole steplessly.

2. The solar cell module terminal box according to claim 1, wherein: the contact includes: a connection face to be electrically connected to the connector member, and a guide face for guiding the connector member inserted in the insertion hole to be overlapped with the connection face.

3. The solar cell module terminal box according to claim 2, wherein the contact includes a clamping piece capable of elastically clamping the connector member guided to be overlapped with the connection face between this clamping piece and the connection face.

4. The solar cell module terminal box according to claim 1, wherein the connector member includes a retention portion capable of allowing insertion of the contact member into the insertion hole and capable also of retaining the contact member against inadvertent withdrawal thereof from the insertion hole through retention relative to the box main body.

5. The solar cell module terminal box according to claim 1, wherein: a portion of the connector member present in the attaching portion includes a contact portion to be electrically contacted with an external connector member and a non-contact portion closer to the wall member than the contact portion, and the non-contact portion has a length greater than the length of the contact portion.

* * * * *